United States Patent
Hattori

(10) Patent No.: US 11,030,091 B2
(45) Date of Patent: Jun. 8, 2021

(54) SEMICONDUCTOR STORAGE DEVICE FOR IMPROVED PAGE RELIABILITY

(71) Applicant: Winbond Electronics Corp., Taichung (TW)

(72) Inventor: Norio Hattori, Kanagawa (JP)

(73) Assignee: Winbond Electronics Corp., Taichung (TW)

( * ) Notice: Subject to any disclaimer, the term of this patent is extended or adjusted under 35 U.S.C. 154(b) by 0 days.

(21) Appl. No.: 16/681,751

(22) Filed: Nov. 12, 2019

(65) Prior Publication Data

US 2020/0242023 A1 Jul. 30, 2020

(30) Foreign Application Priority Data

Jan. 29, 2019 (JP) .............................. JP2019-013019

(51) Int. Cl.
*G06F 12/02* (2006.01)
*G06F 3/06* (2006.01)

(52) U.S. Cl.
CPC ........ *G06F 12/0246* (2013.01); *G06F 3/0619* (2013.01); *G06F 3/0688* (2013.01); *G06F 2212/7201* (2013.01)

(58) Field of Classification Search
CPC .. G06F 12/0246; G06F 3/0619; G06F 3/0688; G06F 2212/7201; G06F 3/0625
See application file for complete search history.

(56) References Cited

U.S. PATENT DOCUMENTS

| 9,946,610 | B2 | 4/2018 | Kinoshita | |
|---|---|---|---|---|
| 2013/0031296 | A1* | 1/2013 | Na | G11B 20/1217 711/102 |
| 2018/0150357 | A1* | 5/2018 | Shen | G06F 11/073 |

FOREIGN PATENT DOCUMENTS

| CN | 107403644 | 11/2017 |
|---|---|---|
| JP | 2009175877 | 8/2009 |
| TW | I479493 | 4/2015 |

* cited by examiner

*Primary Examiner* — Michelle T Bechtold
(74) *Attorney, Agent, or Firm* — JCIPRNET

(57) ABSTRACT

A semiconductor storage device exhibiting improved programming reliability is provided. In the disclosure, flash memory includes a storage controller and a NAND type storage device. The storage controller includes a voltage detecting part, SRAM, RRAM, and a writer/selector. The voltage detecting part detects whether a power supply voltage drops to a fixed voltage. The SRAM stores a conversion table for converting a logical address into a physical address. The RRAM stores the logical address of a block and a page currently being programmed and conversion information for converting the logical address into another physical address when the fixed voltage is detected by the voltage detecting part during a programming process. The writer/selector converts the inputted logical address into the physical address according to the conversion table or the conversion information of the RRAM and programs data on the page of the block selected according to the converted physical address.

7 Claims, 6 Drawing Sheets

| block P | #0 | data | standby |
| | #1 | data | standby |
| | ⋮ | ⋮ | ⋮ |
| | #n | programming | standby |
| | ⋮ | ⋮ | ⋮ |
| | #3E | erasing | standby |
| | #3F | erasing | standby |

| block Q | #0 | data | standby |
| | #1 | data | standby |
| | #2 | data | standby |
| | #3 | erasing | standby |
| | ⋮ | ⋮ | ⋮ |
| | #3E | erasing | standby |
| | #3F | erasing | standby |

SEMICONDUCTOR STORAGE DEVICE FOR IMPROVED PAGE RELIABILITY

CROSS-REFERENCE TO RELATED APPLICATION

This application claims the priority benefit of Japan application serial no. 2019-013019, filed on Jan. 29, 2019. The entirety of the above-mentioned patent application is hereby incorporated by reference herein and made a part of this specification.

BACKGROUND

Technical Field

The disclosure relates to a semiconductor storage device, and more particularly, relates to programming of NAND type flash memory.

Description of Related Art

Generally, NAND type flash memory in a package includes and is formed by a storage chip and a storage controller configured for controlling the storage chip. In this way, the storage controller is burdened with a fixed load such as error correction or management of a bad block of the storage chip, so that the load of the computer of the host side is reduced.

For instance, as shown in FIG. 1, a flash memory system provided by Patent Literature 1 includes flash memory 10 and a host device 40. The flash memory 10 includes a storage controller 20 and a storage chip 30. The storage controller 20 includes a host interface 22 configured for data transferring between the host interface 22 and the host device 40, a memory interface 24 configured for data transferring between the memory interface 24 and the storage chip 30, a micro processing unit (MPU) configured for controlling data transferring or an operation of the storage chip, read only memory (ROM) configured for storing a program or data, random access memory (RAM), etc. The storage chip 30 is, for example, a NAND type flash memory chip.

PRIOR ART LITERATURE

Patent Literature

[Patent Literature 1] Japanese Patent Publication No. 2009-175877

PROBLEMS TO BE ADDRESSED BY THE DISCLOSURE

In NAND type flash memory, a page is treated as a unit for reading and programming, and a block is treated as a unit for erasing. When these operations are instructed by a host device, addresses configured for reading, programming, and eliminating are outputted into a storage controller. The addresses from the host device are logical addresses. The storage controller refers to a conversion table retained in static random access memory (SRAM), so as to convert the logical addresses into physical addresses. When power is on, the conversion table is loaded in the SRAM from a region prepared in a storage unit array.

When programming is instructed by the host device, besides a variety of control signals (an address latch enabling signal (ALE), a command latch enabling signal (CLE), etc.), a programming command, written data, and a logical address LAD are outputted into the storage controller. The logical address LAD includes a logical block address LBA, a logical page address LPA, and a logical column address LCA. As described above, the storage controller refers to the conversion table, coverts the logical block address LBA into a physical block address PBA, and programs data on a page of a block specified by the physical block address PBA. The page in the block is specified by the logical page address LPA.

When such programming is performed, if a power supply voltage drops or power is lost as affected by certain reasons, programming may be interrupted halfway sometimes. If programming ends normally, the storage controller transmits a ready signal into the host device. The host device recognizes that the programming is ended normally and prepares for the next operation. Nevertheless, when programming is interrupted halfway, since the ready signal is not received (for example, a busy signal is always provided), the host device recognizes that the programming is not ended normally. In this case, the host device instructs the storage controller to reprogram when power is on again or after power is restored.

The storage controller converts a logical block address into a physical block address even when reprogramming is performed and programs data on the same page of a block specified by the physical block address. Nevertheless, when the data is reprogrammed on a page on which programming is interrupted, reliability of programming is reduced. That is, data programming of the NAND type flash memory is performed in a storage unit in an elimination state. Nevertheless, not all the storage units on the page which is programmed once are in the elimination state, and as such, a range of a threshold distribution of the programmed data is likely to be greater than an expected range. Alternatively, reprogramming may be performed after the block including the page on which programming interruption occurs is eliminated. However, in this case, data stored in other pages of the block is required to be saved in other blocks, and complicated processing is thus needed.

SUMMARY

The disclosure aims to provide a semiconductor storage device exhibiting improved programming reliability so as to solve the problem of the prior art as described above.

Solution to the Problem

A semiconductor storage device of the disclosure includes a NAND type storage unit array, a detecting part, volatile memory, programming part, non-volatile memory, and a conversion part. The NAND type storage unit array includes a plurality of blocks. The detecting part detects whether a power supply voltage drops to a fixed voltage. The volatile memory stores a conversion table configured for converting a logical address into a physical address. The programming part programs data on a page of the block selected according to the physical address. The non-volatile memory stores the logical address of the page and the block currently being programmed and conversion information configured for converting the logical address into another physical address when the fixed voltage is detected by the detecting part during a period when programming is performed by using the programming part. The conversion part converts the inputted logical address into the physical address according to the conversion table of the volatile memory or the conversion information of the non-volatile memory.

In an embodiment of the disclosure, the another physical address is configured to select an address of a dedicated block prepared for saving a page on which programming interruption occurs. In an embodiment of the disclosure, the another physical address includes a block address configured for selecting a block and a page address configured for selecting a page. In an embodiment of the disclosure, a part writing the conversion information into the non-volatile memory in response to the fixed voltage detected by the detecting part is included. In an embodiment of the disclosure, the fixed voltage is greater than a minimum voltage at which the semiconductor storage device can operate. In an embodiment of the disclosure, the part writes the conversion information into the non-volatile memory before the power supply voltage is lost or before the semiconductor storage device in unable to operate. In an embodiment of the disclosure, the non-volatile memory is resistive memory. In an embodiment of the disclosure, the conversion part selects the conversion information of the non-volatile memory first. In an embodiment of the disclosure, the conversion part compares the inputted logical address with the logical address stored in the non-volatile memory and converts the inputted logical address into the another physical address when the two addresses are identical.

Effects of the Disclosure

According to the disclosure, when the power supply voltage is detected to drop to the fixed voltage during programming, since the logical address storing the block and the page currently being programmed and the non-volatile memory providing the conversion information configured for converting the logical address into another physical address are disposed, programming may be performed on a page exhibiting favorable reliability when reprogramming is performed.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Next, embodiments of the disclosure are described hereinafter in detail with reference to the drawings. In the disclosure, flash memory includes and is formed by a storage device having a storage unit including a NAND type string and a storage controller configured for controlling the storage device. The storage controller and the storage device may be formed on a same chip and may also be formed on different chips. In addition, when the flash memory includes a plurality of chips, the chips may be stacked.

Embodiments

Figure 1:
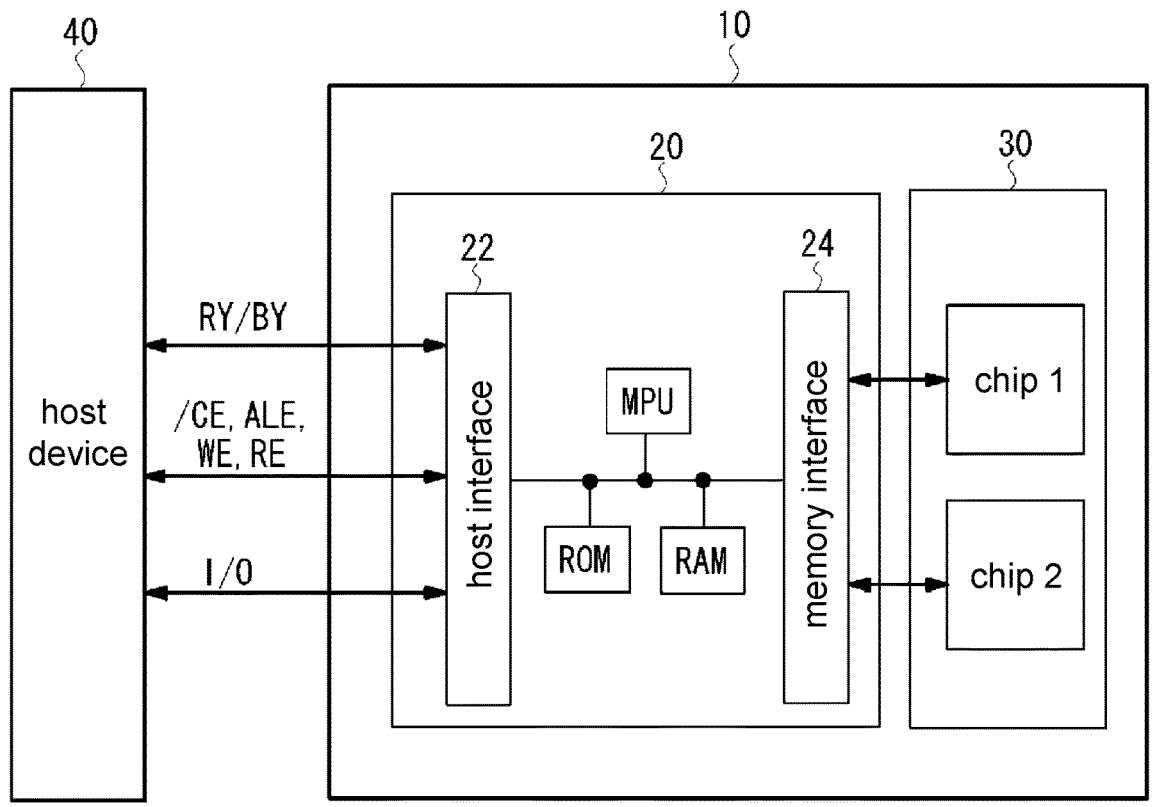
FIG. 1 is a diagram of an example of semiconductor memory of the prior art.
Figure 2:
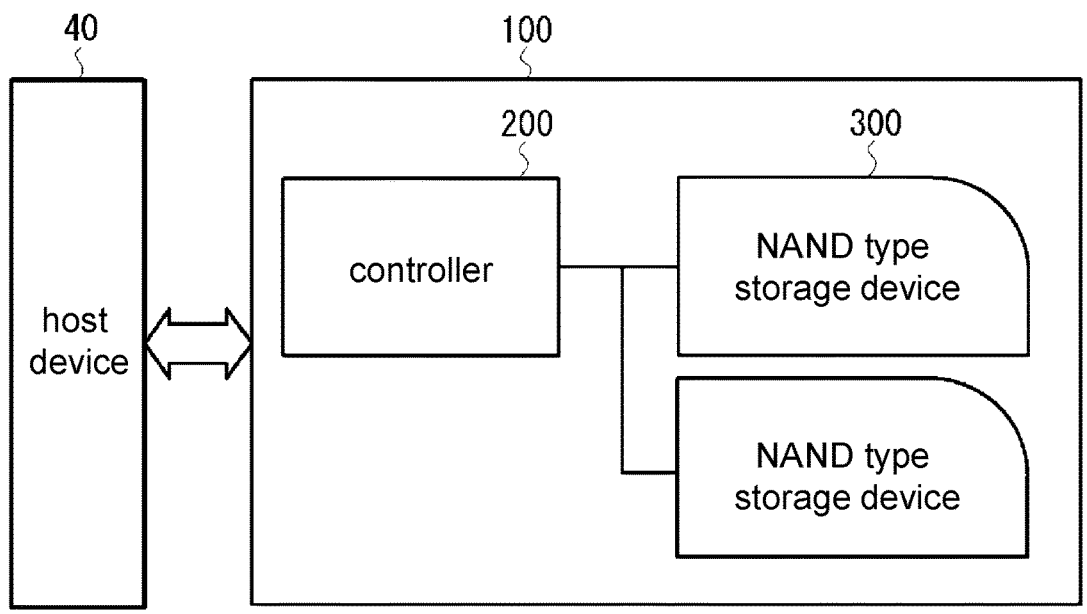
FIG. 2 is a diagram of an entire structure of flash memory according to an embodiment of the disclosure.

FIG. 2 is a diagram of a structure of flash memory 100 according to an embodiment of the disclosure. The flash memory 100 of this embodiment includes and is formed by a storage controller 200 and one or a plurality of NAND type storage devices 300. The storage controller 200 receives a variety of control signals (a command latch enabling signal CLE, an address latch enabling signal ALE, etc.), data, commands, etc. from a host device and control reading, programming (writing), eliminating, etc. of the storage device 300 according to these signals. In addition, the storage controller 200 outputs a read signal or a busy signal indicating an operation state of the storage device into the host device 40.

Figure 3:
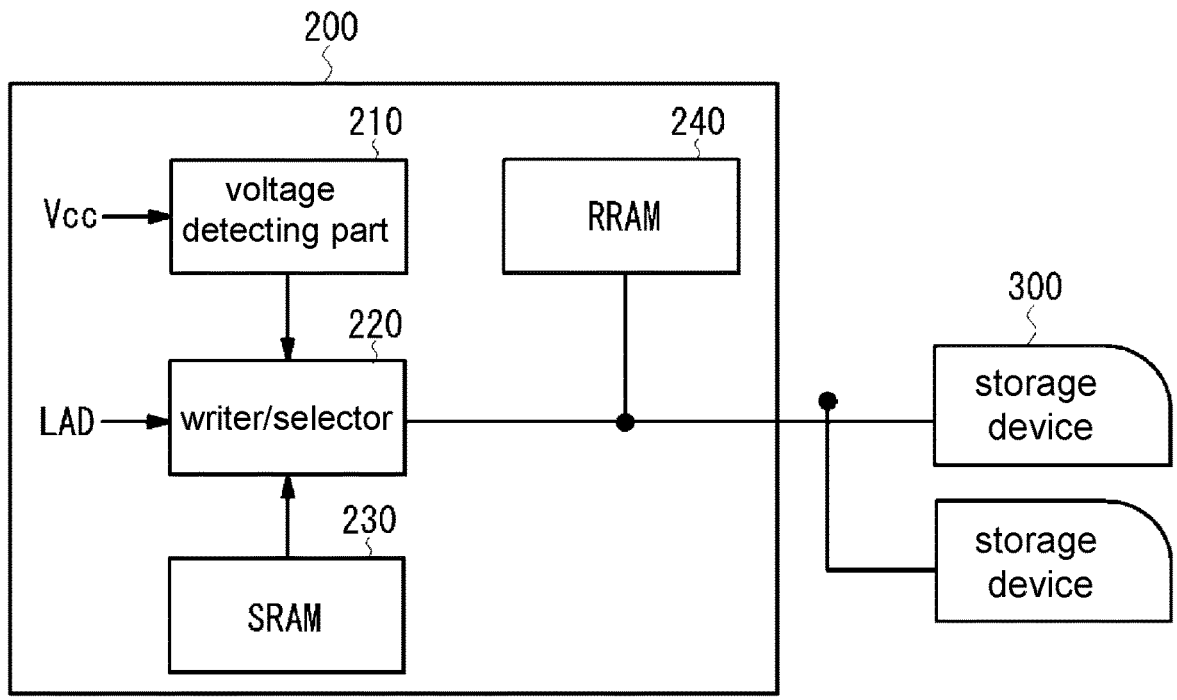
FIG. 3 is a block diagram illustrating an internal structure a storage controller according to an embodiment of the disclosure.

FIG. 3 illustrates an internal structure of the storage controller 200. The storage controller 200 of this embodiment includes and is formed by a voltage detecting part 210, a writer/selector 220, SRAM 230, RRAM (resistive memory) 240. Moreover, besides the structure shown in FIG. 3, the storage controller 200 further includes a micro processing unit (MPU) or ROM and the like and controls various operations of the storage device 300 through executing a soft program stored in the ROM or controls the voltage detecting part 210, the writer/selector 220, the SRAM 230, and RRAM 240.

The voltage detecting part 210 monitors a power supply voltage Vcc supplied to the flash memory 100 or to a system including the flash memory 100 and detects that whether the power supply voltage Vcc drops to a fixed voltage Vd. The fixed voltage Vd is set to be a voltage greater than a minimum voltage Vmin that ensures the operation of the flash memory 100 or is set to be a voltage greater than a voltage Vpwd triggered by a power-down sequence executed by the storage controller 200. As such, at a time point when the power supply voltage Vcc drops to the fixed voltage Vd, the flash memory 100 may still operate and still does not execute the power-down sequence. Not until the power supply voltage Vcc drops to the voltage Vpwd does the power-down sequence be executed. For instance, a boosted voltage is not rapidly discharged, and the operation of the flash memory 100 ends normally. If the fixed voltage Vd is detected by the voltage detecting part 210, an alarm signal is outputted to the parts such as the writer/selector 220.

The writer/selector 220 converts a logical address LAD into a physical address PAD when receiving the logical address LAD from the host device 40. The converted physical address is configured for accessing the storage device 300. In a 1st configuration, the writer/selector 220 converts the logical address LAD into the physical address PAD with reference to a conversion table retained in the SRAM 230. In a 2nd configuration, in the case that the inputted logical address LAD and the logical address LAD stored in the RRAM 240 are identical, the writer/selector 220 converts the logical address into a physical address configured for page saving according to the conversion table stored in the RRAM 240.

When receiving the alarm signal from the voltage detecting part 210 during a programming process, the writer/selector 220 writes the logical address LAD in the programming process and a physical address of a page saving block associated therewith into the RRAM 240. If writing into the RAM 240 is performed through the writer/selector 220, in the 2nd configuration, the writer/selector 220 may perform conversion into the physical address with reference to the conversion table of the RRAM 240

The SRAM 230 retains various data required for the operations of the storage device 300, such as the conversion table regulating a relationship between the logical address and the physical address, a table indicating a state (data is written, eliminated, invalid, etc.) of each page of a block of the storage device. A power-on sequence is executed when power is on, and the data is loaded from a region prepared in the storage unit array of the storage device 300.

The RRAM 240 is resistive random-access memory capable of storing data in a reversible and non-volatile resistive element. Same as the SRAM 230, the RRAM 240 is capable of writing data quickly and is non-volatile memory capable of retaining data even if power is lost.

When the voltage detecting part 210 detects the fixed voltage Vd during the programming process, the RRAM 240 stores the logical address LAD of a programming target and a physical address PAD configured for page saving. Since the time from detection of the fixed voltage Vd to power lost is considerably short, the RRAM capable of performing fast writing is used.

The storage device 300 includes a storage unit array, a word line selection circuit, a column selection circuit, a page buffering/sensing circuit, etc. The storage unit array has a plurality of blocks including NAND type strings. The word line selection circuit selects a word line of the storage unit array according to a row address (a physical block address PBA+a logical page address LPA). The column selection circuit selects a bit line according to a column address. The page buffering/sensing circuit senses data read through selecting a word line or retains data being programmed.

Figure 4:
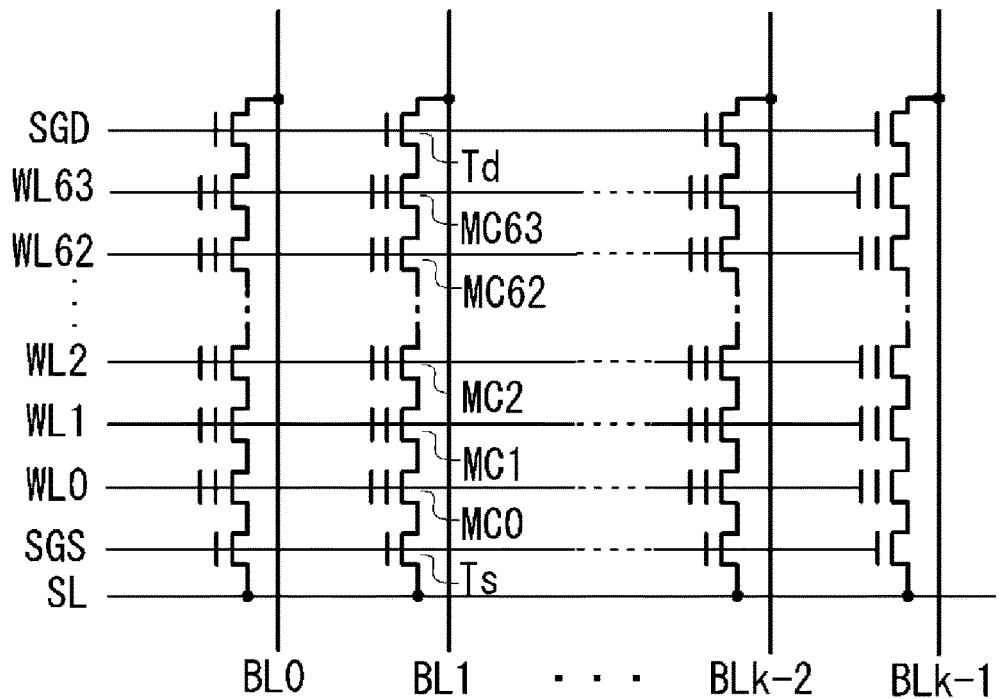
FIG. 4 is a diagram illustrating an internal structure a block of a storage unit array according to an embodiment of the disclosure.

In one block, as shown in FIG. 4, n (e.g., 2 KB) NAND strings in which a plurality of storage units are connected in series are arranged in a row direction. One NAND string NU includes a plurality of storage units MCi (i=1, 2, 3, . . . , and 64) connected in series, a bit line side selection transistor Td connected to a drain side of the storage unit MC64 acting as one end portion of one side, and a source line side selection transistor Ts connected to a source side of a storage unit MC0. A drain of the bit line side selection transistor Td is connected to a corresponding bit line BL, and a source of the source line side selection transistor Ts is connected to a common source line SL.

In a reading operation, a positive voltage is applied to the bit line, a voltage (e.g., 0V) is applied to a selected word line, a pass voltage (e.g., 4.5V) is applied to a non-selected word line, a positive voltage (e.g., 4.5V) is applied to a selection gate line SGD and a selection gate line SGS, the bit line side selection transistor Td and the source line side selection transistor Ts are turned on, and the common source line SL is set to 0V. In the programming operation, a high programming voltage (e.g., 15V-20V) is applied to the selected word line, an intermediate potential (e.g., 10V) is applied to the non-selected word line, the bit line side selection transistor Td is turned on, the source line side selection transistor Ts is turned off, a potential corresponding to data "0" or data "1" is supplied into the bit line BL. In an eliminating operation, 0V is applied to the selected word lines in the block; a high voltage (e.g., 20V) is applied to a P type well; and an electron of a floating gate is extracted onto a substrate to use the block as a unit for erasing data.

Figure 5:
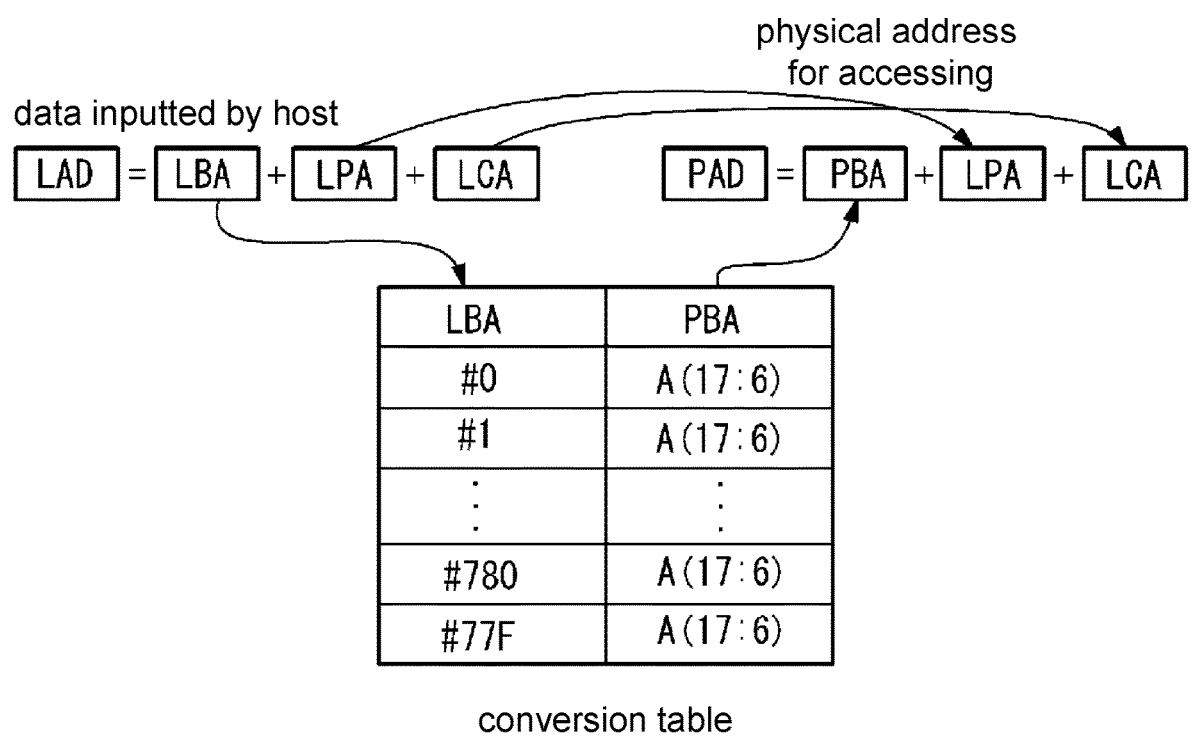
FIG. 5 is a diagram describing an operation of converting a logical address from a host device into a physical address according to a conversion table retained in SRAM.

Next, description of the programming operation of the flash memory 100 is provided. When the flash memory 100 is programmed by the host device 40, in addition to the various control signals, a programming command, data, and the logical address LAD are outputted into the flash memory 100. As shown in FIG. 5, the logical address LAD inputted from the host device includes and is formed by a logical block address LBA, a logical page address LPA, and a logical column address LCA.

If the logical address LAD is received, the writer/selector 220 refers to the conversion table retained in the SRAM 230 and converts the logical block address LBA into the physical block address PBA. In this embodiment, the row address configured for accessing the storage device 300 is 18 bits, and the column address is 12 bits. The upper 12 bits of the row address are provided for an address of a specific block, and the lower 6 bits are provided for an address of a specific page. The logical page address LPA and the logical column address LCA are not converted and are used for forming the physical address directly. In this way, the logical address LAD is converted into the physical address PAD (=PBA+LPA+LCA) configured for accessing the storage device.

The storage controller 200 supplies the converted physical address into the word line selection circuit or the column selection circuit of the storage device 300, selects a block/page through the word line selection circuit, and selects a bit line through the column selection circuit, so as to program data in a selection storage unit of a selection page. A programming voltage is applied to the selection storage unit, and program verification is performed to learn whether data is normally programmed in the selection storage unit. If data is normally programmed, the storage controller 200 outputs the ready signal into the host device 40, but if programming is currently being performed, the storage controller 200 outputs the busy signal into the host device 40.

Figure 6:
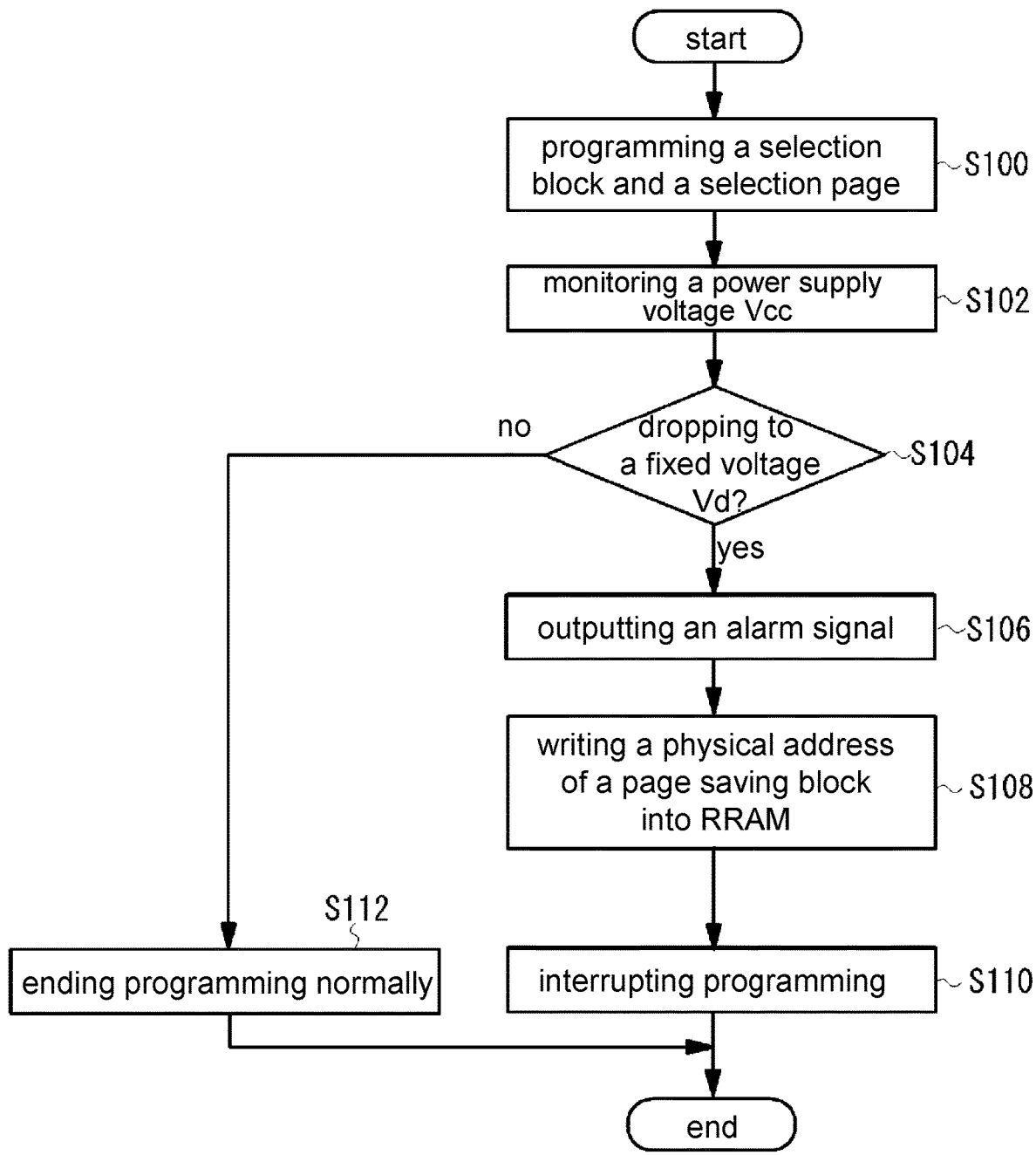
FIG. 6 is a flow chart illustrating restoration of a programming operation when a power supply voltage drops according to an embodiment of the disclosure.

Next, description of a restoration operation when the power supply voltage Vcc drops in the programming operation is provided with reference to the flow chart of FIG. 6. The selection page is programmed through the storage controller 200 (S100), and during such period, the voltage detecting part 210 continues to monitor the power supply voltage Vcc supplied into the flash memory 100 (S102). If the voltage detecting part 210 detects that the power supply voltage Vcc drops, that is, the fixed voltage Vd is detected (S104), the voltage detecting part 210 responds to such detection and outputs the alarm signal (S106).

If being outputted the alarm signal, the writer/selector 220 writes the logical block address LBA and the logical page address LPA currently being programmed and the physical block address PBA and a physical page address PPA of the page saving block configured for converting the logical block address LBA and the logical page address LPA into the physical addresses into the RRAM 240 (S108). Such writing operation continues until power lost occurs.

Figures 7A, 7B, 8:
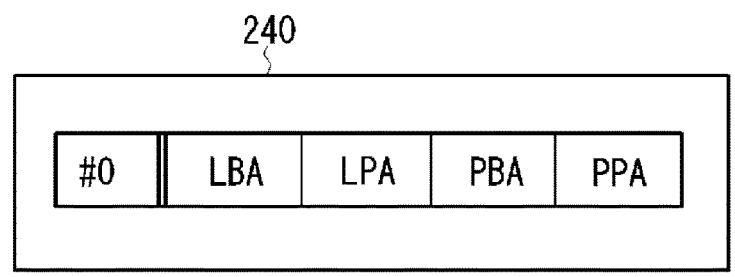
FIG. 7A is a diagram illustrating a selection block and a selection page acting as a programming target.
FIG. 7B is a diagram illustrating a page saving block and a page thereof.
FIG. 8 is a diagram illustrating a logical address of the programming target and a physical address of the page saving block stored in resistive random access memory (RRAM).

Description of such situation is provided with reference to FIG. 7A and FIG. 7B. As shown in FIG. 7A, it is assumed that programming is performed on a selected page #n of a selected block P. At this time, if the power supply voltage Vcc drops to the fixed voltage Vd, the writer/selector 220 rewrites the page #n of the block P retained in a state table of the SRAM to "invalid". The writer/selector 220 then refers to the page saving block of the state table, identifies an available page, and writes the logical block address LBA and the logical page address LPA currently being programmed and physical block address PBA and the physical page address PPA of the page saving block configured for converting the logical block address LBA and the logical page address LPA into the RRAM 240.

FIG. 7B is an example of the page saving block. The page #0 to the page #3 are configured for saving other pages, and the page #3 to the page #3F are available (erasing state). The writer/selector 220 refers to the state table and identifies an available page (the page #3 in this example) of a block Q. As such, as shown in FIG. 8, the logical block address LBA and the logical page address LPA currently being programmed and the physical address PBA and the physical page PPA of the page #3 of the block Q configured for page saving are written into the RRAM 240.

The storage controller 200 interrupts the programming currently being performed at a time point when writing the logical address and the physical address into the RRAM 240 ends (S110). If the power supply voltage Vcc continues to drop, the power-down sequence is then performed, and operation of the flash memory 100 is stopped. In the case that the programming is interrupted, the ready signal is not outputted to the host device 40, or a signal which cannot be identified by the host device 40 is outputted. On the other hand, if the power supply voltage Vcc does not drop to the fixed voltage Vd, programming can be ended normally, and the ready signal is outputted to the host device 40 (S112).

Figure 9:
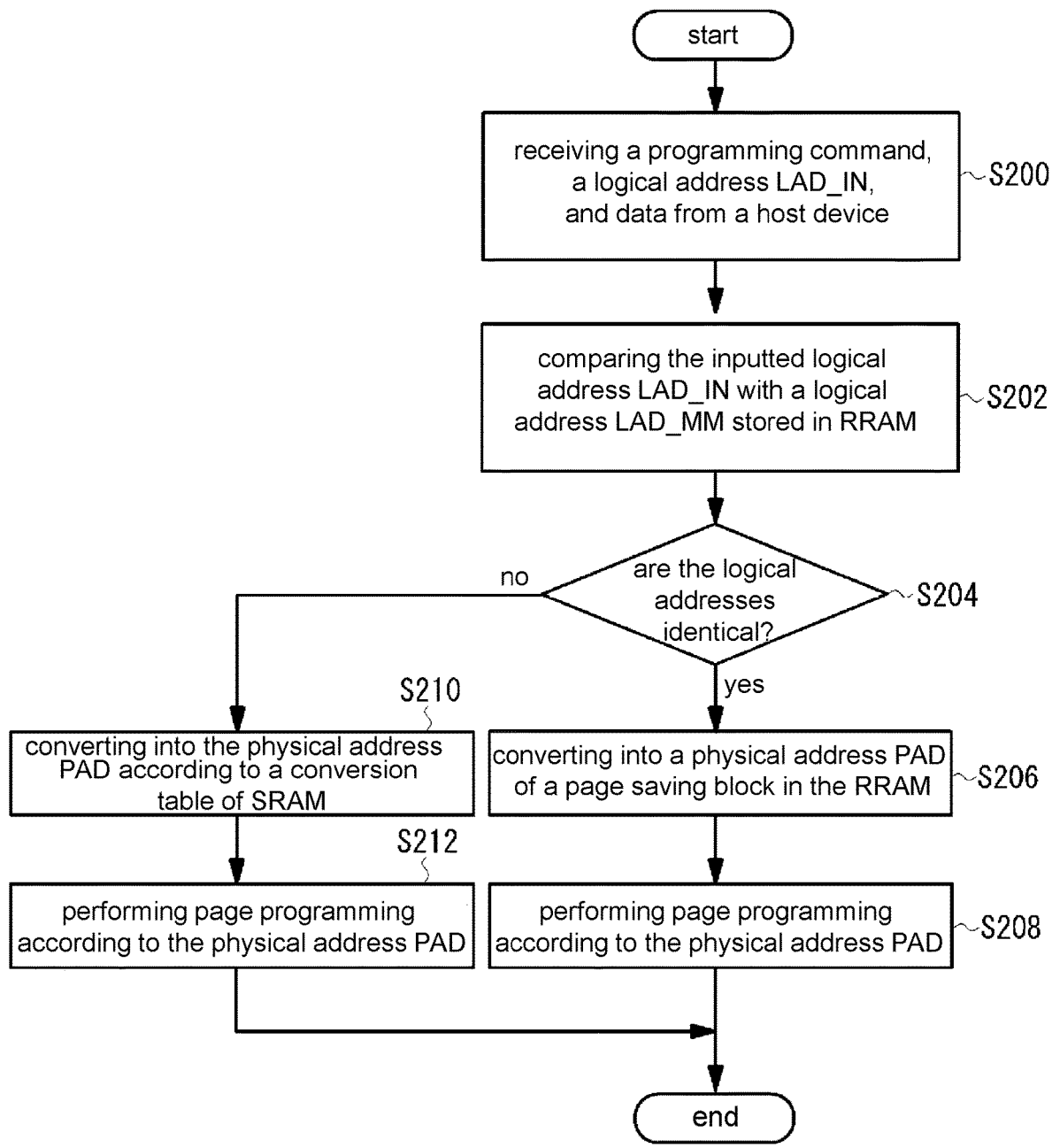
FIG. 9 is a flow chart illustrating a conversion operation of the logical address when reprogramming is performed after power is restored according to an embodiment of the disclosure.

Next, description of an operation of re-starting the interrupted programming is provided with reference to FIG. 9. If the power supply voltage Vcc is restored, the flash memory 100 executes a power-up sequence and is in a state in which the flash memory 100 can operate. When the host device 40 does not receive the ready signal instructed by the last programming, the host device 40 recognizes that the programming does not end normally and thus instructs the flash memory 100 to perform programming again. As such, the storage controller 200 receives a programming command, a logical address LAD_IN, and data from the host device 40 (S200).

The writer/selector 220 initially selects the RRAM 240 and compares a logical address LAD_RR stored in the RRAM 240 with the inputted logical address LAD_IN (S202). When the two logical addresses are identical (S204), the writer/selector 220 converts the logical address LAD_IN into the physical address of the page saving block already stored in the RRAM 240 (S206). The storage controller 200 performs programming on the page of the page saving block (S208).

On the other hand, when the logical address LAD_IN is not provided in the RRAM 240 (S204), the writer/selector 220 refers to the conversion table of the SRAM 220 instead and converts the logical address LAD_IN into the physical address PAD (S210). The storage controller 200 performs programming on a page specified by the converted physical address (S212).

In this way, according to the embodiment, when an unfavorable situation occurs in the programming process, for example, the power supply voltage drops, so that reprogramming is required to be performed, programming exhibiting high reliability is performed. Similarly, the RRAM and the SRAM can also read and write data quickly. Therefore, in the considerably limited time before power is completely lost, the address of the page currently being programmed and the address of a saving block are retained in the RRAM.

Further, in the embodiments, the RRAM is configured to act as the non-volatile memory. Nevertheless, magnetic random access memory (MRAM) (magnetic memory) may also be used in addition to the RRAM as long as the MRAM can write data more quickly than the NAND type memory.

As such, in the embodiments, the logical address and the physical address are stored in the RRAM, but the data to be programmed may also be stored in the RRAM together. A size of the page of the NAND type memory is relatively large. Nevertheless, as long as such data is written into the RRAM before power is lost, such data may be stored together with the physical address of the saving block. When power is restored, the data already stored in the RRAM is programmed in the physical address of the saving block. In this case, it is desirable that the ready signal is outputted into the host device 40 at the time point when the programmed data is stored in the RRAM, so the host device 40 recognizes that the programming ends normally, and that re-programming from the host device 40 is not required.

In this way, in the embodiments, when reprogramming is performed, the writer/selector 220 selects the RRAM 240 first. The inputted logical address LAD_IN is thus compared with the stored logical address LAD_MM. Nevertheless, in addition to this, the RRAM 240 may also be selected first only when the logical address is stored in the RRAM 240, and in other cases, the SRAM 230 is selected. For instance, when programming is interrupted, the storage controller 200 may set flag information indicating that writing of the logical address is performed to the RRAM 240 or flag information indicating programming interruption to be stored into the non-volatile memory in the controller and refers to the flag to determine whether to select the RRAM first after power is restored.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A semiconductor storage device, comprising:
   a NAND type storage unit array, comprising a plurality of blocks;
   a volatile memory, storing a conversion table configured for converting a logical address into a physical address;
   a processor, configured to:
   detect whether a power supply voltage drops to a fixed voltage; and
   perform programming of data on a page of a block selected according to the physical address; and
   a non-volatile memory, wherein the non-volatile memory stores a target logical address of the page of the block currently being programmed and conversion information configured for converting the target logical address into an other physical address when the fixed voltage is detected during a period when the programming is performed by the processor, wherein the processor compares an inputted logical address with the target logical address, and the processor converts the inputted logical address into the physical address according to the conversion table of the volatile memory when the inputted logical address and the target logical address are not identical or converts the inputted logical address into the other physical address according to the conversion information of the non-volatile memory when the inputted logical address and the target logical address are identical.

2. The semiconductor storage device as claimed in claim 1, wherein the other physical address is configured to select an address of a dedicated block prepared for saving a page on which programming interruption occurs.

3. The semiconductor storage device as claimed in claim 1, wherein the other physical address comprises a block address configured for selecting a block and a page address configured for selecting a page.

4. The semiconductor storage device as claimed in claim 1, wherein the processor writes the conversion information into the non-volatile memory in response to the fixed voltage detected.

5. The semiconductor storage device as claimed in claim 1, wherein the fixed voltage is greater than a minimum voltage at which the semiconductor storage device can operate.

6. The semiconductor storage device as claimed in claim 4, wherein the processor writes the conversion information into the non-volatile memory before the power supply voltage is lost or before the semiconductor storage device in unable to operate.

7. The semiconductor storage device as claimed in claim 1, wherein the non-volatile memory is resistive memory.

* * * * *